(12) United States Patent
Puzan et al.

(10) Patent No.: US 7,936,957 B1
(45) Date of Patent: May 3, 2011

(54) HIGH-DENSITY FIBER OPTIC RIBBON CABLE WITH ENHANCED WATER BLOCKING PERFORMANCE

(75) Inventors: James J. Puzan, Canton, GA (US); Christopher W. McNutt, Woodstock, GA (US); Jeffrey S. Laws, Brownwood, TX (US)

(73) Assignee: Superior Essex Communications, LP, Atlanta, GA (US)

( * ) Notice: Subject to any disclaimer, the term of this patent is extended or adjusted under 35 U.S.C. 154(b) by 0 days.

(21) Appl. No.: 12/383,367

(22) Filed: Mar. 24, 2009

Related U.S. Application Data

(63) Continuation-in-part of application No. 12/075,014, filed on Mar. 7, 2008, now Pat. No. 7,590,322.

(60) Provisional application No. 60/906,113, filed on Mar. 9, 2007, provisional application No. 61/070,664, filed on Mar. 25, 2008.

(51) Int. Cl.
*G02B 6/44* (2006.01)
(52) U.S. Cl. ......... 385/105; 385/106; 385/110; 385/112
(58) Field of Classification Search .................. 385/112, 385/105, 106, 110
See application file for complete search history.

(56) References Cited

U.S. PATENT DOCUMENTS

| 5,039,197 | A | 8/1991 | Rawlyk | |
|---|---|---|---|---|
| 7,254,303 | B2 * | 8/2007 | Parsons | 385/102 |
| 2003/0118295 | A1 | 6/2003 | Lail et al. | |
| 2006/0193570 | A1 * | 8/2006 | Brown | 385/100 |

* cited by examiner

*Primary Examiner* — Jerry T Rahll
(74) *Attorney, Agent, or Firm* — King & Spalding LLP

(57) ABSTRACT

A fiber optic cable can inhibit water, that may inadvertently enter the cable, from damaging the cable's optical fibers. The fiber optic cable can comprise buffer tubes extending along the fiber optic cable. The buffer tubes can be arranged such that a ring of buffer tubes surrounds one or more centrally located buffer tubes. Stacked ribbons of optical fibers can be disposed in each buffer tube, along with water-swellable tape and water-swellable yarn. The tape, yarn, and optical fibers can be dry or free from water-blocking gels or fluids. The water-swellable materials can provide an unexpected level of water protection. The water-swellable materials can, for example, limit flow of seawater within the buffer tubes. In an exemplary embodiment, progression of seawater can be limited to three meters or less for a twenty-four hour test period during which the seawater is under about one meter of head pressure.

23 Claims, 5 Drawing Sheets

HIGH-DENSITY FIBER OPTIC RIBBON CABLE WITH ENHANCED WATER BLOCKING PERFORMANCE

CROSS REFERENCE TO RELATED APPLICATIONS

This patent application claims priority under 35 U.S.C. §119 to U.S. Provisional Patent Application No. 61/070,664, entitled "High Density Fiber, Dry, Stranded Ribbon Cable" and filed Mar. 25, 2008 in the name of Puzan et al; and further claims priority as a continuation-in-part application to U.S. patent application Ser. No. 12/075,014, entitled "Fiber Optic Cable With Enhanced Saltwater Performance," filed on Mar. 7, 2008 now U.S. Pat. No. 7,590,322 in the name of James Puzan et al. and assigned to the assignee of the present application, which claims priority to U.S. Provisional Patent Application No. 60/906,113, entitled "Water Blocking Fiber Optic Cable" and filed Mar. 9, 2007. The entire contents of each of the above listed priority patent applications, and specifically U.S. Provisional Patent Application No. 61/070,664, U.S. patent application Ser. No. 12/075,014, and U.S. Provisional Patent Application No. 60/906,113, are hereby incorporated herein by reference.

FIELD OF THE TECHNOLOGY

The present invention relates to placing water-swellable materials in a high-density fiber optic cable to protect ribbons of optical fibers located within the cable from moisture, for example providing an enhanced level of protection against seawater or water having a substantial concentration of salt, such as sodium chloride.

BACKGROUND

Fiber optic cables include one or more optical fibers or other optical waveguides that conduct optical signals, for example carrying voice, data, video, or other information. In a typical cable arrangement, optical fibers are placed in a tubular assembly. A tube may be disposed inside an outer jacket or may form the outer jacket. In either case, the tube typically provides at least some level of protection for the fibers contained therein. Optical fibers are ordinarily susceptible to damage from water and physical stress.

Without an adequate barrier, moisture may migrate into a fiber optic cable and weaken or destroy the cable's optical fibers. Without sufficient physical protection, stress or shock associated with handling the fiber optic cable may transfer to the optical fibers, causing breakage or stress-induced signal attenuation.

One conventional technique for protecting the optical fibers from damage is to fill the cable with a fluid, a gel, a grease, or a thixotropic material that strives to block moisture incursion and to absorb mechanical shock. Such fluids and gels are typically messy and difficult to process, not only in a manufacturing environment but also during field service operations. Field personnel often perform intricate and expensive procedures to clean such conventional materials from optical fibers in preparation for splicing, termination, or some other procedure. Any residual gel or fluid can render a splice or termination inoperably defective, for example compromising physical or optical performance.

Another conventional technology for protecting optical fibers entails placing a water absorbent chemical, such as water-swellable material, within the cable. The chemical absorbs water that may inadvertently enter the cable, and swells to prevent the water from traveling down long lengths of cable and degrading the delicate optical fibers. In one conventional approach, particles of the water absorbent chemical are mixed with the gel discussed above, and the mixture is inserted into the cable. This approach typically suffers from the same drawbacks as using a pure form of a gel; gels and related materials are messy and difficult to process.

In another conventional approach, a water-swellable chemical is applied to the surface of a tape or a yarn that is inserted in the cable lengthwise. If water enters the cable, the water-swellable chemical interacts with the water and swells to impede and stop water flow lengthwise along the cable. However, conventional tape and yarn technologies typically offer limited protection against incursions of seawater. The salt content of seawater typically reduces the effectiveness of water-swellable chemicals via interfering with the interaction between the seawater and the chemicals.

In many instances, a manufacturer will label a fiber optic cable seawater resistant if the cable can pass a test involving subjecting the cable to a three percent seawater mixture. In such tests, typically three percent of the solution is seawater and the remaining ninety-seven percent is distilled water. Since natural seawater has a salinity of between about three percent and about five percent, such tests provide a salinity of only about 0.09 percent (3% seawater multiplied by 3% salinity equals 0.09% net salinity) and a corresponding specific gravity of only about 1.004.

Withstanding seawater having a three percent salinity is significantly more challenging than withstanding a three percent seawater solution. In an actual field deployment, a fiber optic cable may need to withstand the full, three-to-five percent salinity of seawater. Otherwise, the fiber optic cable may have an increased risk of failure.

In additional to lacking adequate saltwater performance, conventional fiber optic cable technology often fails to provide a sufficient density of optical fibers or a desirable level of fiber loading capacity. Conventional cables containing large number of optical fibers typically have diameters that are too large. In other words, users often want a conventional cable of a given diameter to contain more optical fibers than are available with conventional cable designs. Additionally, high fiber-count cables often are heavy and can be cumbersome in terms of field access, installation, and preparation.

One type of conventional fiber optic ribbon cable employs a very large central loose tube design, wherein all optical fibers are located in one central buffer tube with strength rods and jacket material placed outside the central tube. Optical fiber ribbons are stacked inside the buffer tube, typically with a maximum capacity of 864 optical fibers, such as 24 ribbons of 36 fibers each. One drawback of this cable design is that to achieve high fiber capacities, the central buffer tube becomes very large, resulting in excessive space between the fiber optic ribbons and the inner wall of the buffer tube. Conventional dry, water-swellable materials struggle to achieve adequate water blocking in this large annular space. In a typical approach, the space is filled with gel. However, the required quantity of gel increases the weight of the cable thereby encumbering the installation process. Moreover, the gel tends to be messy and craftsman unfriendly.

In another conventional approach, a fiber optic cable includes multiple buffer tubes stranded about a central strength rod with a jacket applied over the buffer tubes and the strength rod. Each buffer tube carries a group of optical fibers, with a typical fiber capacity of 144 optical fibers (12 ribbons of 12 fibers each) in each buffer tube, yielding a cable of 864 optical fibers. In conventional stranded buffer tube designs, the buffer tubes are typically gel filled for water blocking.

One drawback in such conventional cable designs is that achieving higher fiber capacities involves increasing the diameters of the buffer tubes and thereby increasing the overall cable diameter. Further, the gel filling inside the buffer tubes contributes to the cable's weight. Heavy, gel-filled cables are generally more difficult to install, and the gel is messy.

Accordingly, to address these representative deficiencies in the art, an improved capability is needed for protecting optical fibers from water damage. Further need exists for a fiber optic cable that can protect ribbons of optical fibers from seawater or saltwater. A need further exists for a fiber optic cable that can restrict the flow of any saltwater or seawater that might inadvertently enter the cable, to avoid lengthwise progression of unwanted saltwater or seawater. Dry water blocking technology is needed for high-count fiber optic cables, including high-density ribbon cables. Need exists for compact cable designs that can accommodate numbers of optical fibers in a relatively small diameter.

A capability addressing one or more of the aforementioned needs, or some related need in the art, would provide robust fiber optic installments and would promote optical fibers for communications and other applications.

SUMMARY

The present invention can support protecting optical fibers, including fiber optic ribbons, from attack by water, seawater, saltwater, or aqueous fluid containing salt, sodium chloride, or other ionic material.

In one aspect of the present invention, a fiber optic cable can comprise a ring of buffer tubes surrounding one or more centrally located buffer tubes. The cable can comprise a jacket covering the buffer tubes. Each buffer tube can house or carry a stack of fiber optic ribbons, one or more water-swellable yarns, and one or more water-swellable tapes. Within each buffer tube, the stack, the yarn, and the tape can be substantially in contact with one another or can substantially adjoin one another.

The discussion of protecting optical fibers presented in this summary is for illustrative purposes only. Various aspects of the present invention may be more clearly understood and appreciated from a review of the following detailed description of the disclosed embodiments and by reference to the drawings and the claims that follow. Moreover, other aspects, systems, methods, features, advantages, and objects of the present invention will become apparent to one with ordinary skill in the art upon examination of the following drawings and detailed description. It is intended that all such aspects, systems, methods, features, advantages, and objects are to be included within this description, are to be within the scope of the present invention, and are to be protected by the accompanying claims.

Figure 1:
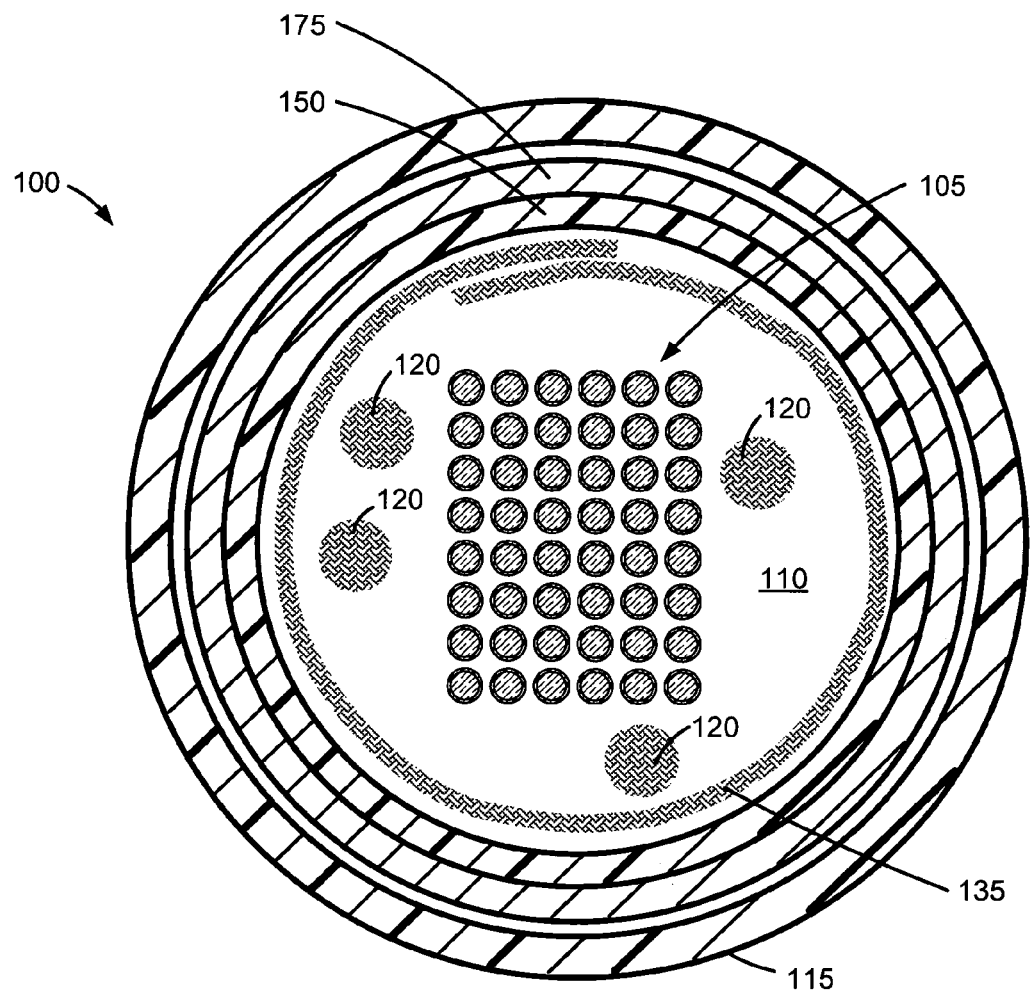
FIG. 1 is a cross sectional illustration of an exemplary fiber optic cable that provides a high level of protection against seawater incursion in accordance with certain embodiments of the present invention.

Many aspects of the invention can be better understood with reference to the above drawings. The elements and features shown in the drawings are not to scale, emphasis instead being placed upon clearly illustrating the principles of exemplary embodiments of the present invention. Moreover, certain dimensions may be exaggerated to help visually convey such principles. In the drawings, reference numerals designate like or corresponding, but not necessarily identical, elements throughout the several views.

DETAILED DESCRIPTION OF EXEMPLARY EMBODIMENTS

The present invention can support protecting optical fibers from damage due to moisture incursion. In certain exemplary embodiments, a compact cable can provide a high optical fiber density, for example about 1008 optical fibers divided among multiple buffer tubes. In certain exemplary embodiments, a fiber optic cable can provide an unexpectedly high level of protection against salty water, such as seawater.

An exemplary embodiment of the present invention can support protecting an optical fiber within a fiber optic cable from water attack. The protection can also include stabilizing the optical fiber and/or cushioning the optical fiber from mechanical impact, shock, physical stress, jarring, unwanted motion, damaging acceleration or deceleration, force, or other detrimental effect.

In certain exemplary embodiments of the present invention, a fiber optic cable can comprise multiple buffer tubes running along the fiber optic cable. Each buffer tube can provide a respective internal space. One or more optical fibers and one or more water-blocking materials can be disposed in each space. Such water-blocking materials can comprise yarns, tapes, powders, particles, or other dry materials that swell upon contact with any water inadvertently entering the fiber optic cable, for example. The fiber optic cable can provide marked resistance to seawater incursions, for example providing unexpected performance under controlled testing and/or in field deployment. In an exemplary test, when an open end of the fiber optic cable (or an individual buffer tube) is subjected to seawater having one meter of head pressure, the fiber optic cable's water-blocking technology can limit the flow or progress of the seawater along one or more of the internal spaces to less than three meters over a twenty-four hour test period.

The fiber optic cable can comprise a jacket that extends along the fiber optic cable. The jacket can comprise a sheath, a sheathing, a casing, a shell, a skin, or a tube spanning the fiber optic cable, typically comprising pliable or flexible material such as plastic or polymer. Thus, the jacket can run lengthwise along the fiber optic cable. The jacket can form or define a core within the cable that can comprise a longitudinal cavity, a hollow space, or a cylindrical volume. In other words, the jacket can enclose a volume that contains various other elements, features, structures, or components of the fiber optic cable, with the jacket typically being open at the cable ends (prior to termination), and therefore exposing the core, at each end of the fiber optic cable.

One or more optical fibers can be situated in the core, running or extending lengthwise along the fiber optic cable. In certain exemplary embodiments, the core may also contain various other linear cabling components, such as strength members, tapes, rip cords, buffer tubes, etc.

A gas, for example air, can be disposed in the core volume along with the optical fibers, with the gas contacting the optical fibers along the length of the fiber optic cable. In other words, the core of the fiber optic cable can include a hollow region (or free volume) that extends lengthwise, with the optical fibers disposed in the hollow region. In certain exemplary embodiments, a buffer tube defines the hollow region. That is, the optical fibers may be located in a buffer tube. Rather than being filled with a fluid or gel for protecting the optical fibers, the inside of the buffer tube is typically dry (absent any unwanted water that might enter the buffer tube).

The term "dry," as used herein in the context of characterizing a fiber optic cable or a buffer tube, generally indicates that the fiber optic cable or buffer tube does not contain any fluids, greases, or gels for blocking water incursion.

As will be discussed in further detail below, a system of one or more water-swellable yarns and one or more water-swellable tapes is disposed in buffer tube to provide water protection. That system can be optimized to provide a marked level of protection against seawater or saltwater incursion.

Certain exemplary embodiments of the present invention can support protecting an optical fiber from attack by water having a high salt content, for example seawater or brackish water. For example, a fiber optic cable can comprise a tube extending along the fiber optic cable and circumferentially surrounding a bundle, group, ribbon, or array of optical fibers. The tube can comprise a sheath, sheathing material, a casing, a shell, a jacket that extends along the cable, a buffer tube, or a structure that is internal to the cable. The tube can comprise an inner wall, such as a surface that faces the optical fibers. That is, the optical fibers can be disposed in the tube, with an inner surface of the tube facing towards the optical fibers and another, outer surface facing away from the optical fibers.

Water-swellable material can be disposed in the tube along with the optical fibers. The water-swellable material can comprise a material, an agent, a chemical, or a substance that captures, takes up, collects, or absorbs water that may enter the tube. That is the water-swellable material can interact with water (or some other foreign chemical or substance with a capability to harm the fiber) to inhibit the water from damaging the optical fiber. The interaction can comprise, without limitation, physical absorption, chemical absorption, binding, one or more chemical reactions, adsorption, a material expansion of the material, soaking up (like an open cell sponge), etc.

The water-swellable material can adhere to a substrate, such as a tape, a flat piece of material, a ribbon, a thread, a yarn, a twine, etc. In certain exemplary embodiments, the water-swellable material can be embedded in another material, for example a foamed polymer. Further, the water-swellable material can comprise particles, powders, or other forms of materials that may be loose, attached to a substrate, or embedded in a larger body of material. Such a water-swellable material can comprise a super absorbent polymer ("SAP") such as sodium polyacrylate or polyacrylamide, for example.

A fiber optic cable in accordance with certain exemplary embodiments of the present invention incorporates water-swellable tapes and water-swellable yarns for capturing or absorbing moisture that may inadvertently enter the cable following field deployment. A system that includes one concentric water-swellable tape and multiple water-swellable yarns protects the cable's optical fibers from excessive longitudinal contact with water that can otherwise attack the fibers and physically and optically degrade the fiber's glassy materials and the cable's overall performance. Longitudinally confining any water that may enter the fiber optic cable effectively confines the water damage. Accordingly, the damaged area can be severed and removed, without sacrificing the entire cable.

A loose tube fiber optic cable in accordance with an exemplary embodiment of the present invention provides a configuration of yarns and tapes that overcomes the limitations of conventional water-blocking technology and that does not necessarily comprise any gels, fluids, or similar water-blocking materials. While typically applied to loose tube fiber optic cables, similar cables that comprise metallic conductors may also benefit from the configuration.

Figure 2:
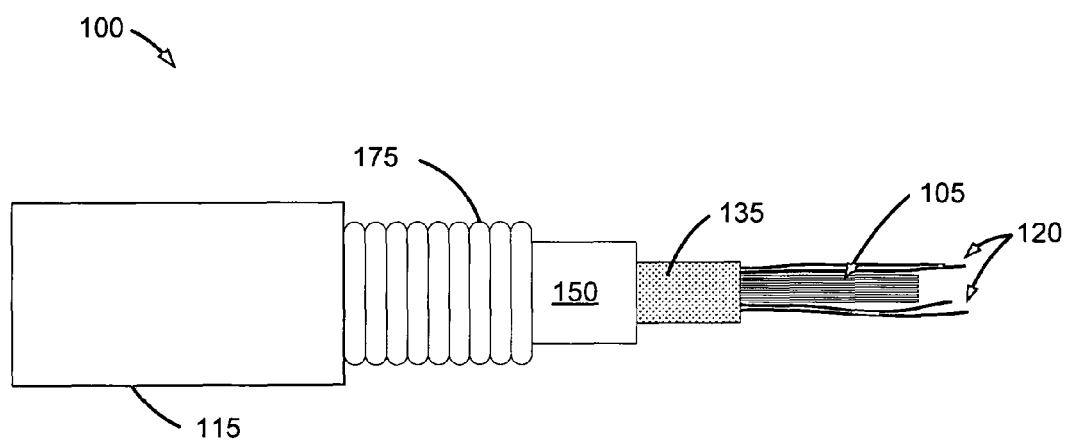
FIG. 2 is a side illustration of an exemplary fiber optic cable that provides a high level of protection against seawater incursion in accordance with certain embodiments of the present invention.
Figure 3:
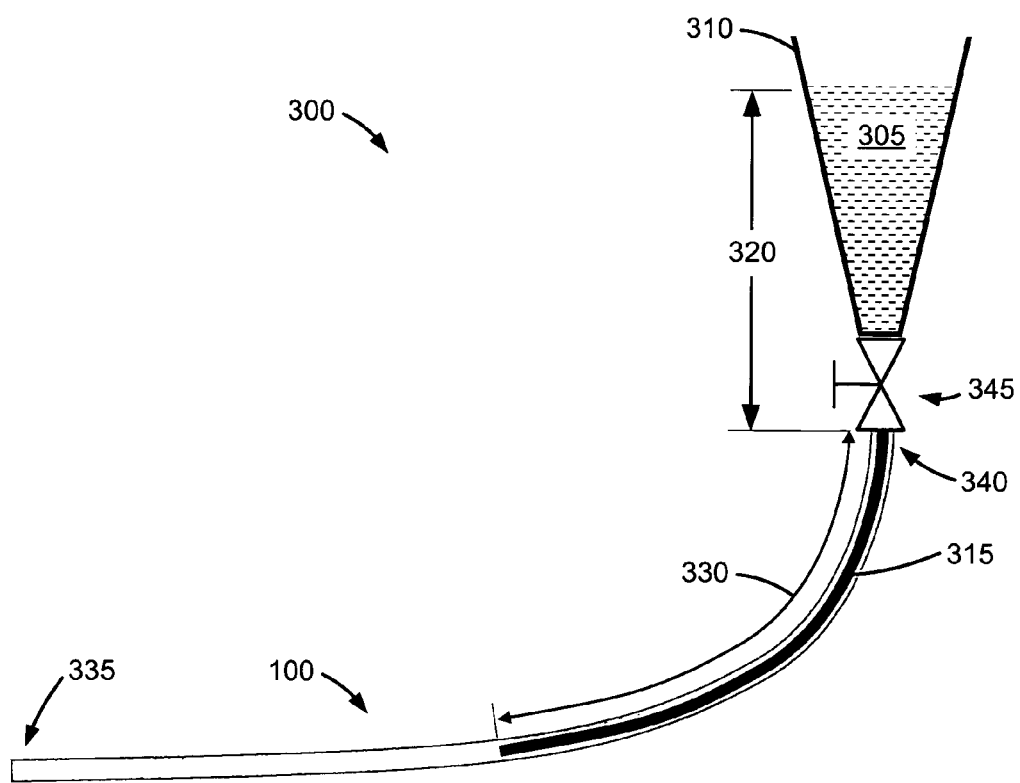
FIG. 3 is an illustration that depicts testing water blockage performance of an exemplary fiber optic cable offering a high level of protection against seawater incursion in accordance with certain embodiments of the present invention.
Figure 4:
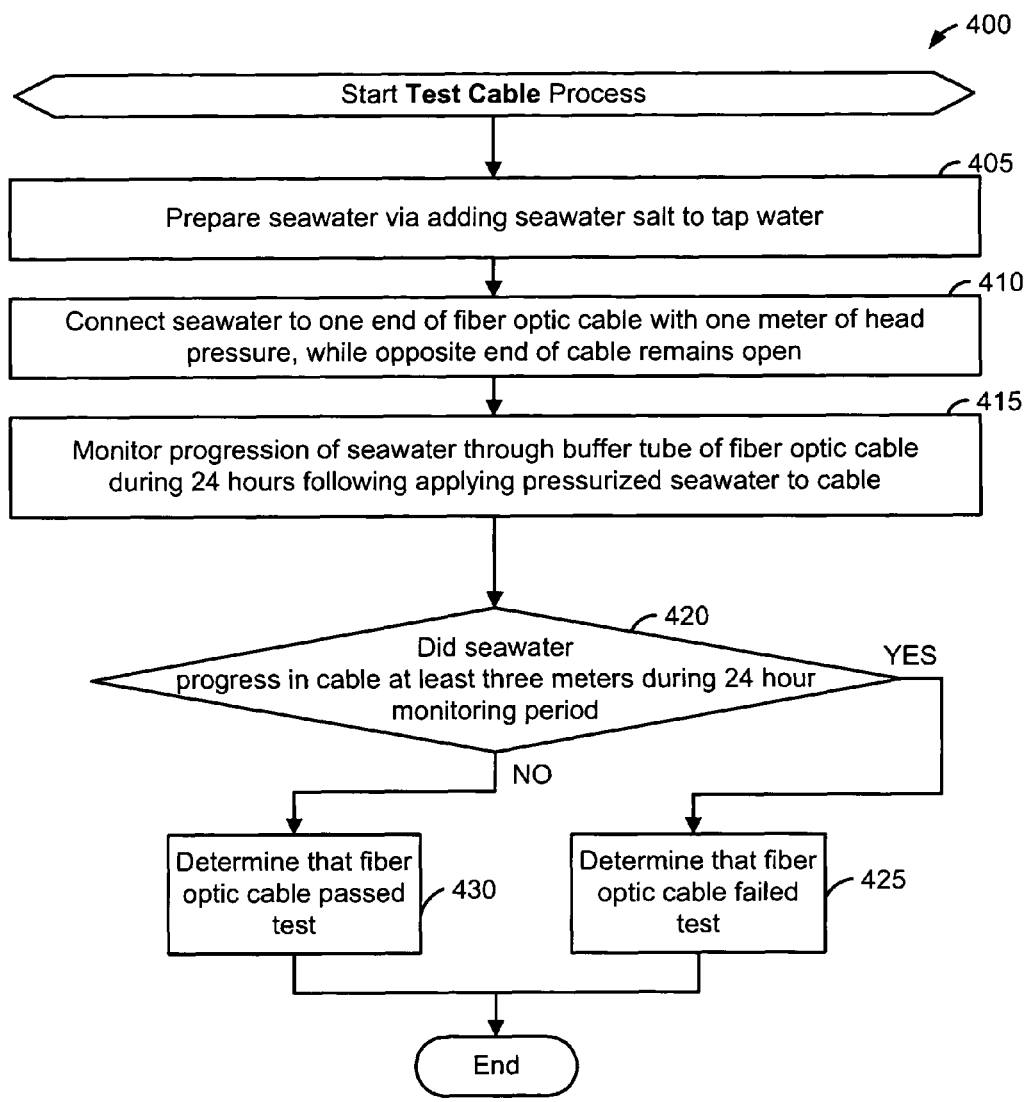
FIG. 4 is a flowchart of an exemplary process for testing seawater blockage performance of fiber optic cables in accordance with certain embodiments of the present invention.
Figure 5:
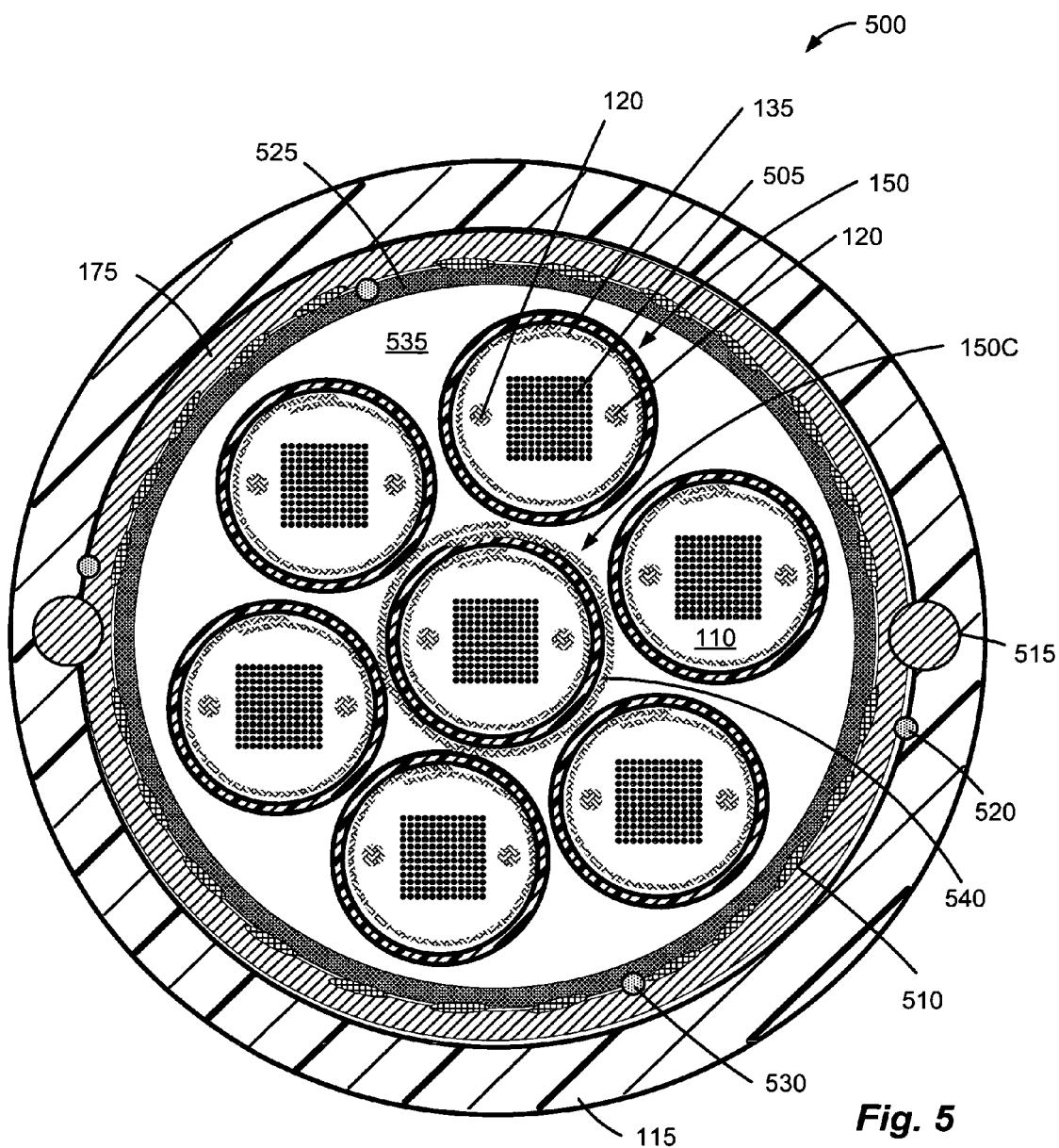
FIG. 5 is a cross sectional illustration of an exemplary fiber optic cable that provides a high number of optical fibers with water protection in a compact profile in accordance with certain embodiments of the present invention.

A method and apparatus for protecting optical fibers will now be discussed more fully hereinafter with reference to FIGS. 1-5, which describe representative embodiments of the present invention. FIGS. 1 and 2 respectively provide end-on and lengthwise views of a fiber optic cable providing enhanced protection against seawater. FIGS. 3 and 4 describe testing seawater performance of fiber optic cables. Tables 1 and 2 present unexpected test results demonstrating a marked level of seawater performance for certain exemplary embodiments of the present invention. FIG. 5 illustrates a high-count fiber optic ribbon cable that provides enhanced water blocking performance in a dry configuration having a compact profile.

The invention can be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" or "exemplary embodiments" given herein are intended to be non-limiting, and among others supported by representations of the present invention.

Turning now to FIGS. 1 and 2, these figures illustrate a fiber optic cable 100 providing a high level of protection against seawater incursion in accordance with certain exemplary embodiments of the present invention. FIG. 1 provides an end-on view, while FIG. 2 presents a side view.

As discussed below, the fiber optic cable 100 has a configuration tailored or optimized to inhibit water penetration and water migration down the cable 100. Thus, the fiber optic cable 100 can block distilled water, freshwater, condensed water, tap water, rain, ionic waters, saltwater, run-off, urban run-off, seawater, brackish water, sewage, water with dissolved sodium chloride, etc.

The fiber optic cable 100 comprises water-swellable tape 135 and water-swellable yarn 120 functioning in a collaborative or synergistic manner. The illustrated configuration can not only block freshwater but also blocks seawater and other water that may contain salt, salt and dissolved minerals, or substantial levels of ionic material. Accordingly, the fiber optic cable 100 can be deployed in a marine environment without necessarily incorporating superabsorbent materials that are rated for marine applications. Thus, a marine-rated cable can be manufactured with economical water-blocking compounds such as sodium polyacrylate conventionally limited to deployment in freshwater environments. In certain exemplary embodiments, sodium polyacrylate is the exclusive water-swellable chemical agent included in the fiber optic cable 100, wherein that agent may be attached to a substrate such as a yarn or a tape.

The exemplary fiber optic cable 100 of FIG. 1 comprises a jacket 115 providing the cable's outer, cylindrical surface. The jacket 115 can have a polymer composition, for example a fluoropolymer such as FEP, TFE, PTFE, PFA, etc. Alternatively, the jacket 115 can comprise olefin, polyester, silicone, polypropylene, polyethylene, medium density polyethylene, polyimide, or some other polymer or other material that provides acceptable strength, fire resistance, or abrasion and chemical properties as may be useful for various applications. Generally, the jacket 115 provides environmental protection as well as strength. The jacket 115 can be characterized as a sheath or a casing.

In the illustrated embodiment, the jacket 115 circumferentially covers a corrugated metal armor 175 that offers mechanical protection, including crush resistance. In many situations the corrugated metal armor 175 is optional and may or may not extend along the length of the fiber optic cable 100. In certain exemplary embodiments, the corrugated metal armor 175 comprises a shield, and the fiber optic cable 100 can be viewed as a shielded cable, for example.

In certain exemplary embodiments, the cable 100 might comprise a small annular space between the jacket 115 and the corrugated metal armor 175. However, the jacket 115 usually adheres to the corrugated metal armor 175, for example as a result of a fabrication process that extrudes the jacket 115 over the corrugated metal armor 175. In certain exemplary embodiments, the corrugated metal armor 175 includes an outer coating of polymer that adheres to the jacket 115 when the jacket 115 is applied to the fiber optic cable 100. In this situation, the coating of polymer bonds the jacket 115 and the corrugated metal armor 175 to one another.

In certain exemplary embodiments, the fiber optic cable 100 comprises strength members (not illustrated in FIGS. 1 and 2), such as slender steel or fiberglass rods or aramid cords, disposed between the corrugated metal armor 175 and the jacket 115. For example, two radial strength members can be located under the jacket 115 to enhance structural support.

One or more "rip cords" may also be disposed between the jacket 115 and the corrugated metal armor 175 to facilitate separating the jacket 115 from the corrugated metal armor 175 via pulling the rip cords. In other words, the rip cords help open the fiber optic cable 100 for installation or field service.

The fiber optic cable 100 also comprises a buffer tube 150 disposed beneath the corrugated metal 175. In certain exemplary embodiments, some annular gap might be present between the buffer tube 150 and the corrugated metal armor 175. Usually, any such gap can also be filled, for example with water-swellable material. Ordinarily, the buffer tube 150 and the corrugated metal armor 175 can be essentially flush with one another.

The term "buffer tube," as used herein, generally refers to a tube for containing one or more optical fibers and for providing such optical fibers annular space for lateral movement. When a fiber optic cable is bent, optical fibers in a buffer tube of the cable may move towards one side of the buffer tube, for example.

In certain exemplary embodiments, the fiber optic cable 100 comprises an aramid material or some other form of strength member disposed between the buffer tube 150 and the corrugated metal armor 175. One or more rip cords may also be disposed between the buffer tube 150 and the corrugated metal armor 175 to facilitate opening the corrugated metal armor 175 in connection with terminating the fiber optic cable 100, or performing some related service.

In an exemplary embodiment, the buffer tube 150 extends along the cable's longitudinal axis and is formed from high-density polyethylene. The buffer tube 150 provides a space 110 for optical fibers 105 and protective materials. The space 110 is a three-dimensional or cylindrical volume extending along the fiber optic cable 100. In the illustrated exemplary embodiment, the protective materials comprise water-swellable yarns 120 and a water-swellable tape 135 disposed in the space 110 along with the optical fibers 105. Accordingly, the buffer tube 150 contains a bundle of optical fibers 105 disposed "loose" in the tube's hollow interior.

In certain exemplary embodiments, the fiber optic cable 100 comprises a gas such as air or nitrogen in the space 110, with such gas contacting the optical fibers, the water-swellable yarns 120, and the water-swellable tape 135, for example. In certain exemplary embodiments, the space 110 is essentially filled with solid and gaseous materials, wherein the water-swellable yarns 120, the water-swellable tape 135, and the optical fibers 105 (which may comprise glass) are solid materials. Accordingly, the fiber optic cable 100 can comprise a "dry cable" that is free from substantial amounts of gels, greases, or fluids for protecting the optical fibers 105 from unwanted water or moisture incursions or for helping maintain the buffer tube's shape.

Moreover, the fiber optic cable 100 can comprise voids within the buffer tube 150 that are filled with gaseous matter or that are otherwise free from water-blocking gels, greases, or fluids. In one exemplary embodiment, the space 110 is filled by, consists of, or essentially consists of: (a) dry water-blocking materials (such as the water-swellable yarns 120 and the water-swellable tape 135); (b) air; and (c) the optical fibers 125. In this situation; contaminates, moisture, debris, water that the water-blocking materials are addressing, secondary materials present from manufacturing, and related matter may nevertheless be present in the space 110.

In the illustrated exemplary embodiment, the fiber optic cable 100 contains 48 optical fibers 105 in the buffer tube 150. The optical fibers 105 can form a bundle with ribbons of the optical fibers 105 adhering to one another to form a single unit. A twist in the bundle of optical fibers 105 along the length of the fiber optic cable 100 captures the ribbon stack into a single unit and helps distribute bending stresses among individual optical fibers 105. That is, a stack of ribbons of optical fibers 105 exhibits a lay or a periodic rotation about its central axis. The bundle of optical fibers 105 has freedom of motion within the buffer tube 150, as the inner diameter of the buffer tube 150 is somewhat larger than the diagonal of the bundle's cross section. In one exemplary embodiment, the ratio of the bundle's diagonal to the inner diameter of the buffer tube 150 is between about 0.62 and about 0.85.

In other words, in certain exemplary embodiments, the optical fibers 105 are organized in linear arrays or "ribbons" of optical fibers 105, with the arrays stacked on top of one another. For example, each ribbon may include twelve optical fibers 105, with the ribbons stacked to achieve the desired fiber capacity (typically up to 18 ribbons).

The illustrated number of optical fibers 105 and the illustrated configuration are intended to be exemplary rather than limiting. Each optical fiber 105 could be a single mode fiber or some other optical waveguide that carries communications data. In various exemplary embodiments, the optical fibers 105 can be single mode, or multimode and can have a composition based on glass, glassy, or silica material. Alternatively, the optical fibers 105 can incorporate plastic material as an optical transmission medium.

In certain exemplary embodiments, the electrically conductive wires, such as pairs of insulated conductors, are substituted for the optical fibers 105. Thus, the water-protective technology can be applied to communications cables that incorporate electrically conductive media rather than optical fibers (or in addition to optical fibers), coax cables, twisted pair cables, and hybrid fiber-copper cables, for example.

In the illustrated exemplary embodiment, the buffer tube 150 contains four water-swellable yarns 120 and one water-swellable tape 135 for protecting the optical fibers 105. The number of water-swellable yarns 120 and the number of water-swellable tapes 135 are exemplary rather than limiting. Strands of water-swellable yarn 120 lie alongside the optical fibers 105, typically in random locations and orientations. In an exemplary embodiment, the four illustrated strands of water-swellable yarns 120 are 1800 denier water-swellable yarn, such as those Geca Tapes BV of Bailleul, France sells under the product designator "Geca GTB-50."

The water-swellable yarns 120 can be slightly expanded in cross section when introduced into the buffer tube 150 during cable fabrication.

With the fiber optic cable 100 comprising water-swellable tape 135 and water-swellable yarns 120, the water absorption capacity of the water-swellable yarns 120 can be reduced relative to using water-swellable yarns as the exclusive water-blocking material. That is, the water-swellable tape 135 and the water-swellable yarn 120 share the water absorption load, and the amount of water-swellable yarn 120 in the fiber optic cable 100 is typically lower than would be required for sufficient water protection if the water-swellable tape 135 was not also present. As discussed above, a synergism between the water-swellable tape 135 and the water-swellable yarn 120 supports using economical water-swellable chemicals, ordinarily limited to freshwater applications, in saltwater environments. Further, as discussed below, the fiber optic cable 100 can provide unexpected performance in terms of blocking saltwater and seawater.

In an exemplary embodiment, the water-swellable yarn 120 comprises particles of superabsorbent polymer ("SAP") that cling to yarn filaments. In certain exemplary embodiments, the particles cling without any adhesives, binders, cured materials, or wetted surfaces. The superabsorbent material chemically reacts with water, when present. However, in certain exemplary embodiments, the superabsorbent material is insoluble (or essentially insoluble) in water.

In one exemplary embodiment, the superabsorbent material comprises sodium polyacrylate powder. Although sodium polyacrylate is ordinarily limited to freshwater application, the architecture of the exemplary embodiment illustrated in FIGS. 1 and 2 provides an unexpectedly high performance with sodium polyacrylate powder as the water-swellable material of the water-swellable yarn 120 and the water-swellable tape 135.

The term "super absorbent polymer" or "SAP," as used herein, generally refers to a material that can absorb or otherwise capture at least 50 times its weight in water (including without limitation liquid and vapor forms of water) or a liquid. Polyacrylonitrile starch graft polymer, saponified polyacrylonitrile starch graft polymer, polyacrylamide, and sodium polyacrylate are examples of SAP; however, this is not an exhaustive list. Typically, SAP swells or may assume a gelatinous state in the presence of water, thereby absorbing the water. SAP materials may have a granular or powder form, may be beads, or may have in a variety of shapes. Many SAP materials can absorb 100 times their weight in water.

The term "water-swellable yarn," as used herein, generally refers to a yarn that comprises a super absorbent polymer, with the term encompassing yarn in which super absorbent polymer clings to a yarn surface. Yarn may comprise one or more threads, filaments, cords, ropes, fibrous materials, fibers, strands, or similar structures that may include man-made or natural materials.

The water-swellable yarns 120 typically have mechanical functionality in addition to absorbing water. The water-swellable yarns 120 provide a "cushioning" effect to reduce contact between the optical fibers 105 and the buffer tube 150, thereby improving signal quality. Orienting the water-swellable yarns 120 along the fiber optic cable's longitudinal axis, rather than helically wound around the optical fibers 105, avoids the water-swellable yarns 120 constricting the optical fibers 105 when the fiber optic cable 100 is strained.

In addition to providing mechanical cushioning, in certain exemplary embodiments, the water-swellable yarns 120 control coupling force between the optical fibers 105 and the fiber optic cable 100. Increasing the amount of water-swellable yarns 120 present in the buffer tube 150 can increase friction between the optical fibers 105 and the inner wall of the buffer tube 150. Likewise, few water-swellable yarns 120 translates to more freedom of longitudinal motion for the optical fibers 105.

The water-swellable yarns 120 inhibit water flow into the fiber optic cable 100 and along the space 110 of the fiber optic cable 100. The water-swellable yarns 120 typically respond faster than the water-swellable tape 135 to initial water incursion, while the water-swellable tape 135 can absorb more water over an extended amount of time. Accordingly, the water-swellable yarns 120 offer the water-swellable tape 135 sufficient time to respond and swell to absorb the water. This synergistic response is particularly evident when seawater is introduced into the fiber optic cable 100 as will be discussed below with reference to FIGS. 3 and 4.

The water-swellable tape 135 within the buffer tube 150 extends lengthwise in the buffer tube 150 and is formed or wrapped around the bundle of optical fibers 105. More specifically, the water-swellable tape 135 runs generally parallel to the bundle of optical fibers 105 and is curled lengthwise over the bundle of optical fibers 105. As a result of curling, one surface of the water-swellable tape 135 is adjacent and essentially parallel to the interior surface of the buffer tube 150. One lengthwise edge of the water-swellable tape 135 is placed over the tape's other lengthwise edge so that the water-swellable tape 135 fully circumscribes the bundle of optical fibers 105. Geca Tapes BV is a suitable tape supplier, for example the product designated "Geca GFX-1135."

The term "water-swellable tape," as used herein, generally refers to a slender strip of material that comprises a super absorbent polymer, with the term encompassing tape in which super absorbent polymer clings to a tape surface. The slender strip of material can comprise a ribbon, a strip of cloth, a strip of film, etc. and may include one, two, or more different types of materials.

In an exemplary embodiment, the water-swellable tape 135 in the buffer tube 150 comprises a single layer of non-woven polyester with particles of superabsorbent polymer powder adhering loosely to one surface thereof. In one exemplary embodiment, the substrate material is not necessarily inherently flame retardant. The particles typically cling to the polyester substrate without any adhesives, curing, or intervening materials. Alternatively, one or more adhesive agents may adhere SAP to the tape substrate. The non-woven substrate can be porous, with SAP particles disposed in, but not necessarily filing the pores. The thickness and width of the substrate (and of the water-swellable tape 145 itself) can be been controlled to optimize water blocking.

The side of the water-swellable tape 135 to which the SAP particles adhere typically faces the optical fibers 105, while the opposite, bare side contacts the interior wall of the buffer tube 150 and thus faces outward. The water-swellable tape 135 and the water-swellable yarn 120 typically comprise similar chemicals for water absorption.

In an exemplary embodiment, the water-swellable tape 135 can be non-compressible, without necessarily needing any foam material, foam layers, adhesives, binders, cured agents, or wetted material.

In certain exemplary embodiments, a second, outer water-swellable tape (not illustrated in FIGS. 1 and 2) is located outside the buffer tube 150 and is curled over the buffer tube 150 in essentially the same manner that the illustrated water-swellable tape 135 is curled over the bundle of optical fibers 105. The outer water-swellable tape typically has the same structure, composition and features as the illustrated water-swellable tape 135. However, one difference between the outer water-swellable tape and the illustrated water-swellable tape 135 is that the outer water-swellable tape is typically wider to accommodate the larger circumference needed to cover the outer surface of the buffer tube 150. Accordingly, the outer tape can comprise a single ply of polyester material coated with SAP particles on one side thereof, with the coated side facing inward.

Exemplary tests for evaluating seawater performance of fiber optic cables will now be described with reference to FIGS. 3 and 4. FIG. 3 illustrates a set up 300 for testing water blockage performance of a fiber optic cable 100 offering a high level of protection against seawater incursion in accordance with certain exemplary embodiments of the present invention. FIG. 4 illustrates a flowchart of a process 400 for testing seawater blockage performance of a fiber optic cable 100 in accordance with certain exemplary embodiments of the present invention.

In the set up 300 of FIG. 3, the fiber optic cable 100 is connected to a reservoir 310 that provides seawater 305 with one meter of head pressure. In other words, vertical distance 320 between the surface of the seawater 305 and the cable end 340 of the fiber optic cable 100 that is under test is one meter.

A valve 345 located between the fiber optic cable 100 holds back the seawater 305 until the test begins, at which point the valve 345 is opened. When the valve 345 is opened, the head pressure applies force to the seawater 305 at the cable end 340, encouraging the seawater 305 to flow and progress through the fiber optic cable 100.

In this test configuration, opening the valve 345 wets the fiber optic cable 100 for the first time. However, an alternative testing methodology (which was not used in any of the actual tests described below) involves pre-wetting the cable end 340 of the fiber optic cable 100 prior to applying head pressure, so as to provide additional reaction time for water-blocking materials. In another alternative testing methodology (which was not used in any of the actual tests described below), head pressure is gradually increased (rather than applied essentially instantaneously via opening the valve 345), again to provide more reaction time for water-blocking materials.

As illustrated in FIG. 4, the testing method 400, entitled "Test Cable," begins at step 405 with preparation of the seawater 305 via a recipe that provide a high ionic concentration. Since ionic water tends to breakdown and limit effectiveness of water-swellable powders and materials, seawater tests are generally more demanding than freshwater tests. Increasing the ionic concentration of water (or increasing the water's specific gravity via adding salt or sodium chloride) reduces the water-blocking performance of water-swellable materials and fiber optic cables incorporating water-swellable materials. Accordingly, blocking a seawater incursion is more challenging than blocking a freshwater incursion.

The seawater 305 is prepared by dissolving sea salt in tap water to achieve a salinity of approximately three percent. That is, the seawater 305 used in the test has a composition of approximately three percent sea salt by weight. This salinity can be achieved by dissolving approximately 114 grams of sea salt per gallon (3.7854 liters) of tap water. Suitable sea salt material is widely available at aquarium retailers under the trade identifier "Oceanic Natural Sea Salt." This recipe is believed to reasonably emulate natural seawater so that the result has a composition approximating natural seawater. After mixing, the measured specific gravity of the saltwater solution should be at least 1.019 using a NIST traceable hydrometer.

The term "seawater," as used herein, refers to water having a salinity of at least three percent. The term "natural seawater," as used herein, refers to typical water of the Atlantic Ocean near the United States.

At step 410, one cable end 340 of a test sample of fiber optic cable 100 is coupled to the reservoir valve 345 with the valve 345 initially closed. The opposite cable end 335 remains open or unobstructed. Opening the valve 345 wets the cable end 340, which was dry prior to valve opening, and subjects the fiber optic cable 100 to one meter of water pressure or "head pressure."

At step 415, seawater 305 advances or flows through the space 110 of the fiber optic cable's buffer tube 150 as illustrated in FIG. 3 at reference number "315." The distance 330 of progression of the seawater 315 is monitored over a twenty-four hour test period, typically with human intervention.

At inquiry step 420, a determination is made regarding the distance 330 of seawater progression within the fiber optic cable 100. If the distance 330 is less than three meters after twenty-four hours has elapsed following subjecting the fiber optic cable 100 to seawater 305 under one meter of head pressure, then step 430 follows step 420. At step 430, the fiber optic cable 100 is determined to have passed the test. Following step 430, process 400 ends.

If, on the other hand, the seawater 315 has flowed three or more meters during the twenty-four hour test period, then at step 425, the fiber optic cable 100 is deemed to have failed the test. Following step 425, process 400 ends.

In summary, process 400 determines whether a fiber optic cable 100 fails or passes a seawater test according to whether seawater 305 pressurized to one meter of head pressure flows through the cable's buffer tube 150 a distance of three meters or more during the first twenty four hours following contact with the seawater 305.

Unexpected results of testing seawater performance of fiber optic cable samples will now be discussed with reference to Tables 1 and 2, shown below. These tests indicate that certain orientations of water-swellable tape 135 and water-swellable yarn 120 in a buffer tube 150, for example as illustrated in FIG. 1 and discussed above, provide unexpectedly high performance in blocking seawater penetration inside a fiber optic cable 100.

Table 1 shows the results of subjecting five fiber optic cables to the seawater testing method of the process 400, as described above with reference to FIGS. 3 and 4. These five cables were fabricated and tested with a goal of optimizing a configuration of water-swellable materials.

The fiber optic cable denoted "1" in Table 1 included an eight-millimeter buffer tube containing 48 optical fibers and a water-swellable tape having a width of 26 millimeters. This fiber optic cable failed the seawater test as the seawater flowed more than three meters ("m") in two minutes.

The fiber optic cable denoted "2" in Table 1 included an eight-millimeter buffer tube containing 48 optical fibers, two water-swellable yarns, and a water-swellable tape having a width of 26 millimeters. This fiber optic cable failed the seawater test as the seawater flowed more than three meters during the first hour of the test.

The fiber optic cable denoted "3" in Table 1 included an eight-millimeter buffer tube containing 48 optical fibers, four water-swellable yarns, and a water-swellable tape having a width of 26 millimeters. This fiber optic cable failed the seawater test as the seawater flowed more than three meters during the two hours of the test.

The fiber optic cable denoted "4" in Table 1 included an eight-millimeter buffer tube containing 48 optical fibers, four water-swellable yarns, and a water-swellable tape having a width of 30 millimeters. The water-swellable tape was wrapped lengthwise over the optical fibers and two of the four water-swellable yarns. The other two water-swellable yarns were located between the water-swellable tape and the inner surface of the buffer tube. This fiber optic cable failed the seawater test as the seawater flowed more than three meters during the twenty-four-hour test period.

The fiber optic cable denoted "5" in Table 1 included an eight-millimeter buffer tube containing 48 optical fibers, four water-swellable yarns, and a water-swellable tape having a width of 30 millimeters wrapped over the optical fibers and the water-swellable yarns. In other words, this fiber optic cable featured a buffer-tube architecture consistent with the exemplary embodiment 100 illustrated in FIG. 1 and discussed above. This test cable passed the seawater test as the seawater flowed less than three meters over the full twenty-four-hour test period.

Based on these test results, it is believed that adding additional water-swellable yarns to the fiber optic cable denoted "5" (adjacent the four water-swellable yarns present), would further limit the flow distance. For example, via adding one, two, three, or four additional water-swellable yarns, water flow could be limited to one meter or substantially less over the twenty-four hour test period. However, in many applications, the indicated performance would be acceptable.

TABLE 1

Results of Seawater Penetration Tests

| | Cable Description | Flow Distance (330) at Indicated Time After Wetting | | | | Result |
|---|---|---|---|---|---|---|
| | | 2 min | 1 hr | 2 hrs | 24 hrs | |
| 1) | 8 mm Buffer Tube w/48 optical fibers. 26 mm wide water-swellable tape. | >3 m | n/a | n/a | n/a | fail |
| 2) | 8 mm Buffer Tube w/48 optical fibers. 26 mm wide water-swellable tape, plus 2 water-swellable yarns. | 2.11 m | >3 m | n/a | n/a | fail |
| 3) | 8 mm Buffer Tube w/48 optical fibers. 26 mm wide water-swellable tape, plus 4 water-swellable yarns. | 1.37 m | 2.33 m | >3 m | n/a | fail |
| 4) | 8 mm Buffer Tube w/48 optical fibers. 30 mm wide water-swellable tape, plus 4 water-swellable yarns. (2 yarns under tape, 2 yarns over tape) | 1.00 m | 1.26 m | 1.44 m | >3 m | fail |
| 5) | 8 mm Buffer Tube w/48 optical fibers. 30 mm wide water-swellable tape, plus 4 water-swellable yarns (all 4 yarns under tape) | 1.18 m | 1.30 m | 1.36 m | 2.65 m | pass |

Table 2 shows the results of subjecting three commercial cable products to the seawater testing method of the process 400, as described above with reference to FIGS. 3 and 4. Accordingly, the samples of Table 1 and Table 2 all underwent a common testing procedure.

Although each of the commercial cable products described in Table 2 are marketed as providing seawater resistance, all failed the seawater testing of the process 400 that is described above with reference to FIGS. 3 and 4.

Commercial Product 1 was a fiber optic cable that included a dry buffer tube containing 48 optical fibers and water-swellable yarns. A three-meter sample of this product failed the seawater test as seawater flowed at least three meters in approximately three hours.

Commercial Product 2 was a fiber optic cable that included a dry buffer tube containing 144 optical fibers and water-swellable yarns. A three-meter sample of this product failed the seawater test as seawater flowed at least three meters in approximately two hours.

Commercial Product 3 was a fiber optic cable that included a dry buffer tube containing 144 optical fibers and a water-swellable tape comprising foamed polymer material. A three-meter sample of this product failed the seawater test as seawater flowed at least three meters in approximately five minutes.

TABLE 2

Results of Seawater Penetration Tests on Commercial Products

| | Cable Description | Result | Time to Failure |
|---|---|---|---|
| Commercial Product 1 | Dry buffer tube w/48 optical fibers. Water-swellable yarns only. | Failed | ~3 hours |
| Commercial Product 2 | Dry buffer tube w/144 optical fibers. Water-swellable yarns only. | Failed | ~2 hours |
| Commercial Product 3 | Dry buffer tube w/144 optical fibers. Water-swellable foamed tape only. | Failed | ~5 minutes |

Tables 1 and 2 show that seawater resistance for dry fiber optic cables depends significantly upon configuration of water-swellable materials. The unexpected results presented in Tables 1 and 2 confirm that exemplary embodiments of the present invention can provide a marked improvement over conventional approaches.

Turning now to FIG. 5, this figure illustrates a cross sectional view of a fiber optic cable 500 that provides a high number of optical fibers with water protection in a compact profile in accordance with certain exemplary embodiments of the present invention. In certain exemplary embodiments, the fiber optic cable 500 can comprise multiple ones of the units illustrated in FIG. 1 and discussed above. Further, exemplary embodiments of the fiber optic cable 500 can provide saltwater protection consistent with the foregoing discussion.

As illustrated in FIG. 5, the fiber optic cable 500 can achieve a high optical fiber density in a dry configuration or in a gel-free implementation. In one exemplary embodiment, the fiber optic cable 500 can have an outer diameter of approximately 31.5 millimeters ("mm"), a weight of about 650 kilograms per kilometer, a rated tensile load of 2700 Newtons, and a rated long-term residual load of 800 Newtons. Other embodiments can have various other dimensions, specifications, and ratings, as appropriate.

As illustrated, the fiber optic cable 500 comprises a ring of buffer tubes 150 disposed about a central buffer tube 150C. More specifically, the illustrated fiber optic cable 500 comprises a six-around-one configuration whereby six buffer tubes 150 are disposed generally about or can be stranded around a seventh buffer tube 150C. In certain exemplary embodiments, the buffer tubes 150, 150C are substantially identical to one another or are manufactured to a common specification. In certain exemplary embodiments, the elements and configuration within each of the buffer tubes 150, 150C can be substantially identical or made to a common manufacturing specification. The buffer tubes 150, 150C can have a nominal outer diameter of about 8.0 mm and be formed from high-modulus, high-flex PBT compound, for example.

The illustrated configuration synergistically combines ruggedness provided by buffer tube stranding with a fully operational central buffer tube 150C to achieve high loading capacity and high cable strength. Accordingly, the fiber optic cable 500 can carry a large number of optical fibers in a compact diameter that is light weight. For example, the configuration of the illustrated embodiment can support a capacity of 1008 optical fibers in a cable diameter that is less than about 32 mm.

Each buffer tube 150, 150C carries or encloses a stack of fiber optic ribbons 505, two or four water-swellable yarns 120, and a water-swellable tape 135. In the illustrated embodiment, the water-swellable tape 135 contacts or adjoins the inner surface of the associated buffer tube 150, 150C, the water-swellable yarn 120, and the stack of fiber optic ribbons 505. Further, the stack of fiber optic ribbons 505 contacts or adjoins the water-swellable yarn 135. This configuration can support desirable and/or enhanced water-blocking performance, including seawater blocking as discussed above.

In certain exemplary embodiments, the water-swellable tape 135 comprises one-ply, typically non-woven polyester, and is impregnated with an SAP powder, such as a sodium polyacrylate or a potassium polyacrylate/acrylamide copolymer. In an exemplary embodiment, the water-swellable tape 135 runs along and contacts the inner wall of its associated buffer tube 150, 150C, with the SAP powder disposed on the side of the water-swellable tape 135 that faces the stack of fiber optic ribbons 505. The water-swellable tape 135 can be a type known in the trade as "Geca GFX-1135," as discussed above.

The water-swellable yarns 120, which can be a type known in the trade as "Geca GTB-50" as discussed above, not only absorb water, but also act as control elements that can be increased or decreased, as appropriate, for a range of optical fiber loadings. The water-swellable yarns 120 can fill potential water cavities and can increase or decrease optical fiber-to-cable coupling force. Thus, the water-swellable tape 135 and the water-swellable yarn 120 affect coupling force, which is a cable parameter that may be specified for dry tube cables to avoid longitudinal migration of optical fibers within a cable.

As discussed above, the water-swellable yarns 120 also inhibit water flow into the fiber optic cable 500, analogous to a flow restrictor, giving the water-swellable tape 135 additional time to respond and swell. Also, the water-swellable yarns 120 can provide a cushioning effect to control contact or force transfer between the stack of fiber optic ribbons 505 and the buffer tube 150, thus improving signal quality. In certain exemplary embodiments, the water-swellable yarns 120 are installed substantially parallel with each tube's longitudinal axis, rather than being helically wound around the stack of fiber optic ribbons 505. In many applications, disposing the water-swellable yarns 120 substantially parallel to the stack of fiber optic ribbons 505 can help avoid constricting the optical fibers when the fiber optic cable 500 is strained.

The buffer tubes 150, 150C can be tested and rated to typical industry standards, such as Telcordia GR-20-CORE, RDUP Bulletin 1753F-601 (PE-90) and ANSI/ICEA S-87-640, for mechanical and environmental performance requirements. In certain embodiments, the corner optical fibers in each stack of fiber optic ribbons 505 may physically impact or bump into the associated buffer tube wall, and thus become susceptible to some microbending-induced performance (optical signal) loss. As such, the optical fibers of the stacks of fiber optic ribbons 505 can selected according to bend loss sensitivity. Bend loss sensitivity of an optical fiber can be predicted as a function of Mode Field Diameter ("MFD") and Cutoff Wavelength ("CW"). To provide low signal loss across a range of environmental conditions, the corner optical fibers in each stack of fiber optic ribbons 505 can be selected such that the corner fiber's MFD divided by CW is less than 7.0, for example. (An optical fiber's MFD divided by its CW is typically referred to as the fiber's "MAC number.")

In the illustrated embodiment, each stack of fiber optic ribbons 505 comprises 12 fiber optic ribbons, with each ribbon comprising 12 optical fibers. Other embodiments can comprise fewer or more ribbons, ribbons with fewer or more optical fibers, or optical fibers that are not ribbonized, for example. Accordingly, the illustrated numbers of optical fibers, ribbons, and buffer tubes is exemplary, is non-limiting, and is among others that exemplary embodiments of the present invention can support.

As illustrated, another water-swellable tape 540 is applied over the central buffer tube 150C, between central buffer tube 150C and the six surrounding buffer tubes 150. Suitable product for this water-swellable tape 540 is available from Chengdu Centran Industrial Co., Ltd of Sichuan, China under the trade identifier "Centran CZSD-20." The water-swellable tape 540 helps prevent water flow in the open space 535 of the cable core.

Various structures can be applied over the buffer tubes 150, 150C to provide strength and protection. In the illustrated embodiment, a medium density polyethylene jacket 115 forms the cable's exterior surface. A corrugated metal armor 175 (optional in many embodiments) is located under the jacket 115 and provides crush resistance. The corrugated metal armor 175 is typically coated with a polymer to promote adhesion with or coupling to the jacket 115. In certain exemplary embodiments, amorphous poly-olefin ("APO/APAO") hot melt flood compound bonds the corrugated metal armor 175 to the outer jacket 115.

Two ripcords 520 are disposed between the corrugated metal armor 175 and the jacket 115 to facilitate jacket removal. Two high-strength ripcords 530 are disposed under the corrugated metal armor 175 to facilitate armor removal 175 during field service or cable installation.

A longitudinally wrapped water-swellable tape 525 is disposed under the corrugated metal armor 175, facing the buffer tubes 150, 150C. Water-swellable glass strength yarns 510 provide additional support and longitudinal strength. As illustrated, the fiber optic cable 500 comprises 24 of the water-swellable glass strength yarns 510 located between the water-swellable tape 525 and the corrugated metal armor 175. Alternatively, the water-swellable glass strength yarns 510 can be disposed under the water-swellable tape 525, for example adjoining the ring of buffer tubes 150.

As illustrated, two rigid strength members 515 are at least partially embedded in the jacket 515, but alternatively can be disposed under the jacket 515 without embedding. The rigid strength members 515 can be formed of carbon steel and can be placed at 3 and 9 o'clock positions or at 6 and 12 o'clock positions, for example.

Technology for protecting a cabled optical fiber from water has been described. From the description, it will be appreciated that an embodiment of the present invention overcomes the limitations of the prior art. Those skilled in the art will appreciate that the present invention is not limited to any specifically discussed application or implementation and that the embodiments described herein are illustrative and not restrictive. From the description of the exemplary embodiments, equivalents of the elements shown therein will suggest themselves to those skilled in the art, and ways of constructing other embodiments of the present invention will appear to practitioners of the art. Therefore, the scope of the present invention is to be limited only by the claims that follow.

What is claimed is:

1. A fiber optic cable comprising:
    a plurality of buffer tubes, each housing a stack of fiber optic ribbons, a water-swellable tape, and a water-swellable yarn contacting one another within a dry space that extends lengthwise along the fiber optic cable; and
    a jacket circumferentially covering the plurality of buffer tubes,
    wherein the fiber optic cable is operable to limit advance of seawater, under a head pressure of approximately one meter, through the dry spaces to less than approximately three meters in twenty four hours.

2. The fiber optic cable of claim 1, wherein one of the plurality of buffer tubes is disposed substantially at a longitudinal axis of the fiber optic cable adjacent six other buffer tubes of the plurality of buffer tubes.

3. The fiber optic cable of claim 2, wherein the plurality of buffer tubes are arranged in a six-around-one configuration, and
    wherein each stack of fiber optic ribbons comprises at least about 100 optical fibers.

4. The fiber optic cable of claim 3, wherein limiting advance of seawater to less than approximately three meters in twenty four hours comprises limiting advance of seawater to a range between approximately 2.65 meters and approximately three meters.

5. The fiber optic of claim 3, wherein the fiber optic cable is operable to limit advance of the seawater to between approximately two-and-one-half meters and approximately three meters during a twenty-four period of time that follows the plurality of buffer tubes contacting the seawater.

6. The fiber optic cable of claim 3, wherein the fiber optic cable is further operable to limit advance of seawater, having a head pressure of at least one meter, through the dry space to less than approximately three meters during a twenty-four hour period following subjecting the fiber optic cable to the seawater.

7. The fiber optic cable of claim 1, wherein the seawater comprises approximately three percent salt by weight or has a specific gravity of approximately 1.019.

8. The fiber optic cable of claim 1, wherein the water-swellable yarn lies alongside the stack of fiber optic ribbons in a random location and orientation.

9. The fiber optic cable of claim 1, wherein each of the water-swellable tapes comprises sodium polyacrylate for limiting advance of the seawater, and wherein each of the water-swellable yarns comprises sodium polyacrylate for limiting advance of the seawater.

10. The fiber optic cable of claim 1, wherein all of the water-swellable tape in one of the buffer tubes and all of the water-swellable yarn in the one buffer tube have a combined weight,
    wherein the all of the water-swellable tape and the all of the water-swellable yarn limit advance of seawater in the one of the buffer tubes substantially more than an amount of the water-swellable yarn having the combined weight, and
    wherein the all of the water-swellable tape and the all of the water-swellable yarn limit advance of seawater in the one of the buffer tubes more than an amount of the water-swellable tape having the combined weight.

11. The fiber optic cable of claim 1,
    wherein the fiber optic cable has a longitudinal axis, and
    wherein the water-swellable tape is curled around the water-swellable yarn and the plurality of optical fibers with the water-swellable tape and the water-swellable yarn extending substantially parallel to one another and with the water-swellable yarn oriented along the longitudinal axis.

12. The fiber optic cable of claim 1, wherein the stack of fiber optic ribbons contacts the water-swellable tape, wherein the stack of fiber optic ribbons contacts the water-swellable yarn, and wherein the water-swellable tape contacts the water-swellable yarn.

13. The fiber optic cable of claim 1, wherein the water-swellable yarn is detached from the water-swellable tape.

14. A fiber optic cable comprising:
    a jacket running lengthwise along the cable, defining a cable core, and having an outside diameter of about 35 millimeters or less;
    a plurality of buffer tubes loosely disposed in the cable core and arranged so that each buffer tube is adjacent at least three other buffer tubes;
    a metallic armor disposed between the jacket and the plurality of buffer tubes;
    a pair of rigid strength members extending lengthwise along the fiber optic cable and at least partially embedded in the jacket;
    a ripcord contacting the jacket;
    a first water-swellable element circumscribing the plurality of buffer tubes; and
    a second water-swellable element circumscribing one buffer tube in the plurality of buffer tubes and substantially contacting each buffer tube in the plurality of buffer tubes,
    wherein each buffer tube circumferentially surrounds:
        a dry stack of fiber optic ribbons that comprises at least about 144 optical fibers;
        a dry water-swellable yarn in contact with and disposed substantially parallel to the dry stack; and
        a dry water-swellable tape circumferentially surrounding the dry water-swellable yarn and the dry stack, contacting the dry stack, and contacting an interior buffer tube surface.

15. A fiber optic ribbon cable comprising:
    an exterior jacket extending along the fiber optic ribbon cable and circumferentially covering a ring of dry buffer tubes disposed about one or more dry buffer tubes, wherein each of the dry buffer tubes carries a stack of fiber optic ribbons, a water-swellable yarn, and a water-swellable tape, with the stack, the yarn, and the tape touching one another.

16. The fiber optic ribbon cable of claim 15, wherein the stack and the yarn touch, wherein the stack and the tape touch, and wherein the yarn and the tape touch.

17. A fiber optic communication cable comprising:
a jacket circumferentially surrounding at least seven dry tubes extending longitudinally in a six-around-one configuration,
wherein each dry tube circumferentially surrounds a respective two-dimensional array of optical fibers that substantially adjoins a respective water-swellable yarn, and
wherein a respective water-swellable tape substantially adjoins the respective two dimensional array and the respective water-swellable yarn.

18. The fiber optic communication cable of claim 17,
wherein all water-swellable materials in one of the dry tubes have a combined weight,
wherein the all of the water-swellable materials are operative to provide a substantially higher level of water blocking than an amount of water-swellable yarn having the combined weight, and
wherein all of the water-swellable materials are operative to provide a substantially higher level of water blocking than an amount of water-swellable tape having the combined weight.

19. The fiber optic communication cable of claim 17, wherein each of the seven dry tubes is operable to limit advance of seawater, under a head pressure of approximately one meter, to less than approximately three meters of longitudinal distance in twenty four hours,
wherein the seawater has a specific gravity of at least about 1.019 or comprises approximately three percent salt by weight,
wherein each respective water-swellable tape comprises sodium polyacrylate for limiting advance of the seawater, and
wherein each of the water-swellable yarns comprises sodium polyacrylate for limiting advance of the seawater.

20. The fiber optic communication cable of claim 17, wherein the seven dry tubes are loose,
and wherein the respective water-swellable yarn runs substantially parallel to the respective two-dimensional array of optical fibers and is detached from the water-swellable tape.

21. The fiber optic communication cable of claim 20, wherein the fiber optic communication cable further comprises:
a water-swellable tape circumferentially surrounding the seven dry tubes and disposed between the seven dry tubes and the jacket; and
another water-swellable tape circumferentially surrounding one of the seven dry tubes and substantially contacting the seven dry tubes.

22. The fiber optic communication cable of claim 21, wherein the respective two-dimensional array of optical fibers comprises at least about twelve fiber optic ribbons stacked on top of one another.

23. The fiber optic communication cable of claim 21, wherein each two dimensional array of optical fibers comprises at least about 144 optical fibers.

* * * * *

UNITED STATES PATENT AND TRADEMARK OFFICE
CERTIFICATE OF CORRECTION

| | | |
|---|---|---|
| PATENT NO. | : 7,936,957 B1 | Page 1 of 1 |
| APPLICATION NO. | : 12/383367 | |
| DATED | : May 3, 2011 | |
| INVENTOR(S) | : James J. Puzan et al. | |

It is certified that error appears in the above-identified patent and that said Letters Patent is hereby corrected as shown below:

Column 17, Claim 1, line 36, "twenty four" should read -- twenty-four --.

Column 17, Claim 4, line 48, "twenty four" should read -- twenty-four --.

Column 19, Claim 17, line 17, "two dimensional" should read -- two-dimensional --.

Column 19, Claim 19, line 34, "twenty four" should read -- twenty-four --.

Column 20, Claim 23, line 30, "two dimensional" should read -- two-dimensional --.

Signed and Sealed this
Eleventh Day of October, 2011

David J. Kappos
*Director of the United States Patent and Trademark Office*